United States Patent
Knechtges

(10) Patent No.: US 9,457,774 B2
(45) Date of Patent: Oct. 4, 2016

(54) TECHNIQUE FOR DETERMINING AN ACTUATING FORCE APPLIED TO A VEHICLE BRAKE THAT CAN BE ACTUATED HYDRAULICALLY AND MECHANICALLY

(75) Inventor: Josef Knechtges, Mayen (DE)

(73) Assignee: Lucas Automotive GmbH, Koblenz (DE)

(*) Notice: Subject to any disclaimer, the term of this patent is extended or adjusted under 35 U.S.C. 154(b) by 0 days.

(21) Appl. No.: 14/116,351

(22) PCT Filed: Mar. 2, 2012

(86) PCT No.: PCT/EP2012/000947
§ 371 (c)(1),
(2), (4) Date: Mar. 21, 2014

(87) PCT Pub. No.: WO2012/152350
PCT Pub. Date: Nov. 15, 2012

(65) Prior Publication Data
US 2014/0214269 A1    Jul. 31, 2014

(30) Foreign Application Priority Data

May 10, 2011    (DE) .................. 10 2011 101 062

(51) Int. Cl.
| B60T 8/17 | (2006.01) |
| B60T 13/58 | (2006.01) |
| B60T 13/66 | (2006.01) |
| B60T 13/74 | (2006.01) |
(Continued)

(52) U.S. Cl.
CPC ............... *B60T 8/171* (2013.01); *B60T 8/17* (2013.01); *B60T 13/58* (2013.01); *B60T 13/588* (2013.01); *B60T 13/66* (2013.01); *B60T 13/741* (2013.01); *B60T 17/22* (2013.01)

(58) Field of Classification Search
CPC .......... B60T 8/17; B60T 8/171; B60T 13/58; B60T 13/588; B60T 13/66; B60T 13/741
See application file for complete search history.

(56) References Cited

U.S. PATENT DOCUMENTS

| 3,643,763 A | * | 2/1972 | Hay .............................. 188/71.8 |
| 5,307,906 A | * | 5/1994 | Jamzadeh et al. .............. 303/50 |
| 5,573,312 A | * | 11/1996 | Muller et al. ................. 303/151 |

(Continued)

FOREIGN PATENT DOCUMENTS

| CN | 1098689 A | 2/1995 |
| DE | 19732168 C1 | 1/1999 |

(Continued)

*Primary Examiner* — Dale W Hilgendorf
(74) *Attorney, Agent, or Firm* — MacMillan, Sobanski & Todd, LLC

(57) ABSTRACT

A technique for determining an actuating force applied to a vehicle brake is described, wherein the vehicle brake is equipped with an electromechanical brake actuator, and wherein a first actuating-force component is generated mechanically by actuating the electromechanical brake actuator and a second actuating-force component is generated hydraulically by actuating a hydraulic pressure source. A method aspect comprises the steps of detecting a first parameter relative to the electromechanical brake actuator and indicating the first actuating-force component, determining a second parameter indicating the second actuating-force component from a progression of the detected first parameter, and determining the actuating force applied to the vehicle brake from the first and the second parameters.

22 Claims, 4 Drawing Sheets

(51) Int. Cl.
  *B60T 8/171* (2006.01)
  *B60T 17/22* (2006.01)

(56) References Cited

U.S. PATENT DOCUMENTS

| | | | |
|---|---|---|---|
| 6,394,235 B1* | 5/2002 | Poertzgen et al. | 303/3 |
| 6,738,703 B2* | 5/2004 | Ewinger | B60T 13/741 |
| | | | 701/70 |
| 7,744,166 B2 | 6/2010 | Leiter et al. | |
| 8,433,491 B2* | 4/2013 | Burnett | B60T 13/741 |
| | | | 701/70 |
| 8,448,756 B2 | 5/2013 | Knechtges | |
| 9,031,756 B2* | 5/2015 | Baehrle-Miller | B60T 13/741 |
| | | | 701/70 |
| 2009/0133975 A1 | 5/2009 | Gilles | |
| 2011/0042171 A1* | 2/2011 | Knechtges | 701/70 |
| 2012/0205202 A1 | 8/2012 | Baehrle-Miller et al. | |
| 2015/0025767 A1* | 1/2015 | Feigel | B60T 8/17 |
| | | | 701/70 |

FOREIGN PATENT DOCUMENTS

| | | |
|---|---|---|
| DE | 102004004992 A1 | 9/2005 |
| DE | 102008012338 A1 | 9/2009 |
| DE | 102009028505 A1 | 2/2011 |
| WO | 2005733043 A1 | 8/2005 |
| WO | 2007036357 A1 | 4/2007 |
| WO | 2009109210 A1 | 9/2009 |

* cited by examiner

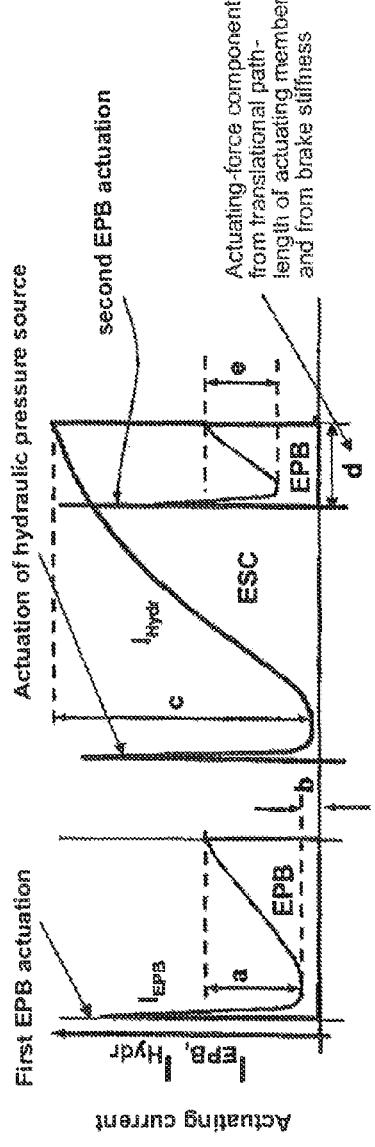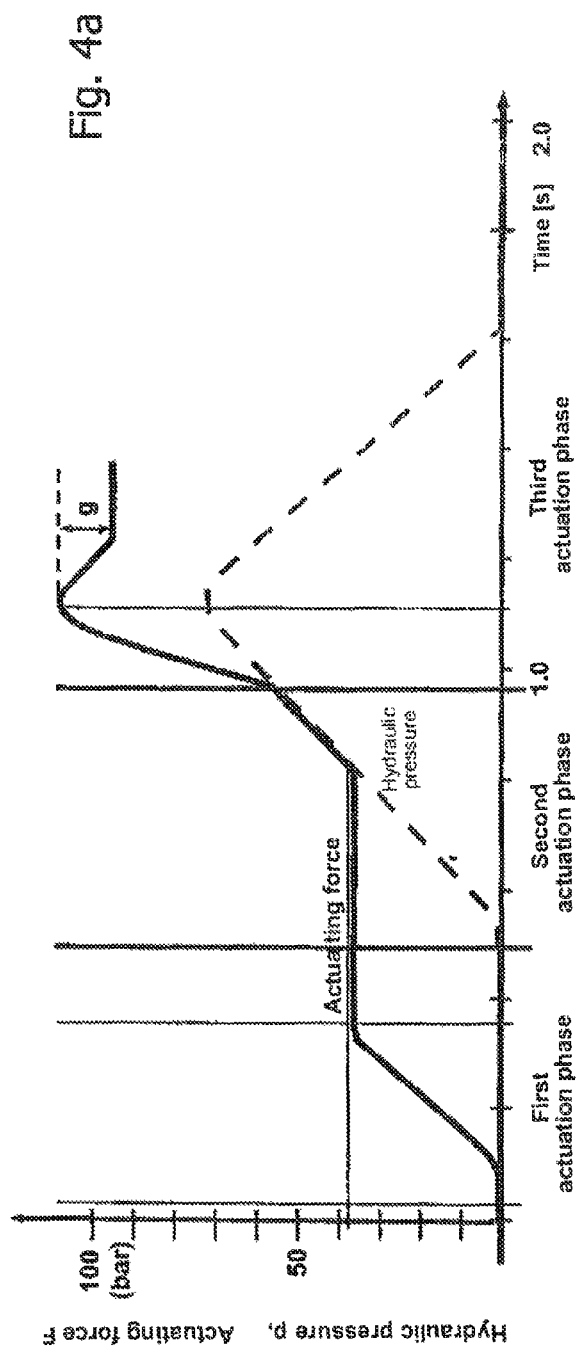
Fig. 4b
Fig. 4a

TECHNIQUE FOR DETERMINING AN ACTUATING FORCE APPLIED TO A VEHICLE BRAKE THAT CAN BE ACTUATED HYDRAULICALLY AND MECHANICALLY

CROSS-REFERENCE TO RELATED APPLICATIONS

This application is a national stage of International Application No. PCT/EP2012/000947 filed Mar. 2, 2012, the disclosures of which are incorporated herein by reference in entirety, and which claimed priority to German Patent Application No. DE 10 2011 101 062.2 filed May 10, 2011, the disclosures of which are incorporated herein by reference in entirety.

BACKGROUND OF THE INVENTION

The present invention relates to the determination of an actuating force applied to a vehicle brake. The invention relates, in particular, to a vehicle brake that is capable of being actuated hydraulically and mechanically, and also to the determination of the actuating force generated in the case of joint hydraulic and mechanical actuation.

Hydraulic vehicle braking systems are increasingly being equipped with an electric parking brake (EPB). A braking system of such a type is known from DE 197 32 168 C2, and corresponding U.S. Pat. No. 6,394,235 B1, the disclosures of which are incorporated by reference herein in entirety, and comprises an electric drive motor, a gear mechanism and an actuating member in the form of a nut/spindle arrangement. The latter is provided for the purpose of translatorily moving a hydraulic piston of the hydraulic vehicle brake which is in contact with the nut/spindle arrangement. In this way, the hydraulic piston can be actuated mechanically without a hydraulic pressure on the hydraulic piston having to be built up. The actuating force exerted on the vehicle brake by the displacement of the hydraulic piston in this case is determined directly from the current consumption of the drive motor (i.e. without any force sensor).

The possibilities for application of the electric parking brake are not restricted only to the operation of a parking brake. By virtue of suitable mechanisms for control and regulation, the electric parking brake can be employed for the purpose of realizing further safety functions and comfort functions, such as, for example, a hill-start assistant ("hill-hold" function) or an emergency-brake assistant. The realization of such functions presupposes a coordinated interaction of electric parking brake and hydraulic-pressure generation. This, in turn, requires a coordinated monitoring and control of both systems.

Furthermore, it may be advantageous to assist the electric parking brake hydraulically during the generation of an actuating force (e.g. during a parking-brake procedure). However, this requires a precise determination and monitoring of the individual actuating-force components and of the resulting actuating force, in order to drive the electric parking brake and a hydraulic pressure generator appropriately, and in order to avoid malfunctions in the course of building up the actuating force.

BRIEF SUMMARY OF THE INVENTION

A feature underlying the invention is to provide a method for reliably determining the actuating force applied to a vehicle brake that is capable of being actuated mechanically and hydraulically.

According to one aspect, a method is provided for determining an actuating force applied to a vehicle brake, wherein the vehicle brake is equipped with an electromechanical brake actuator, and wherein a first actuating-force component is generated mechanically by actuation of the electromechanical brake actuator, and a second actuating-force component is generated hydraulically by actuation of a hydraulic pressure source, the method comprising the following steps: detecting a first parameter related to the electromechanical brake actuator and indicating the first actuating-force component; determining a second parameter indicating the second actuating-force component from a progression of the detected first parameter; and determining the actuating force applied to the vehicle brake from the first and the second parameters.

The electromechanical brake actuator can be employed for the purpose of realizing a parking-brake function, an emergency-brake assistant, a hill-start assistant and/or further braking functions. The method can therefore be carried out for the purpose of determining the actuating force within the scope of one of these functions.

The first parameter is detected during the actuation of the electromechanical brake actuator. The first parameter may correspond to the electrical current consumption or to another parameter of an electric motor assigned to the electromechanical brake actuator. For example, the effective current consumption can be determined. By 'effective current consumption', the current consumption of the electric motor in the loaded state minus the no-load current is meant. The electric motor is in the loaded state when an actuating member assigned to the electromechanical brake actuator is translatorily moving a hydraulic piston assigned to the vehicle brake.

As an alternative to this, the first parameter may also be determined from the actuation path-length of the actuating member that is travelled during the actuating procedure. In this case, the actuating force can be determined from the detected actuation path-length and from information (e.g. stored in advance) about the brake stiffness.

The second parameter, which indicates the second actuating-force component built up by the hydraulic pressure source, can be determined from the temporal progression of the detected electrical current consumption of the electromechanical brake actuator. From the temporal progression of the current consumption, an idling phase of the electric motor during the actuation of the electromechanical brake actuator can be determined. The idling phase of the motor indicates a load-free translational motion of an actuating member. A load-free translational motion of the actuating member occurs, for example, when the actuating member is not in contact with a hydraulic piston. This may be the case when the hydraulic piston has been displaced spatially with respect to the actuating member by reason of a hydraulic pressure applied additionally.

The second parameter may correspond to the duration of the idling phase of the motor. As an alternative to this, the second parameter may correspond to an integrated motor speed during the idling phase of the motor. The integrated speed of the motor can be determined from a previously stored idling speed of the motor and from the duration of the idling phase of the motor, or by means of a current-ripple counter. In both cases the determined second parameter is a measure of the actuation path-length travelled by the actuating member in the load-free state.

The second parameter can be drawn upon for the purpose of determining the second actuating-force component. The second actuating-force component in this case can be determined from the determined second parameter and from a known brake stiffness with the aid of a model. Furthermore, other known characteristic parameters of the brake actuator (such as, for example, the reduction ratio between the electric motor and the actuating member) may enter into the model.

The first actuating-force component and the second actuating-force component generated on the vehicle brake can each be generated during at least one or more actuation phases. In the case where several actuation phases are present, the electromechanical brake actuator and the hydraulic pressure source can be actuated simultaneously during at least one actuation phase, in order to build up an actuating force.

According to one embodiment, the first actuating-force component and the second actuating-force component may be generated in three actuation phases, wherein during the first actuation phase the electromechanical brake actuator is actuated, during the second actuation phase the hydraulic pressure source is actuated, and during the third actuation phase the electromechanical brake actuator and the hydraulic pressure source are actuated simultaneously. But it is also conceivable that the actuating force is generated in two successive actuation phases. In this case, the hydraulic pressure source and the electromechanical brake actuator may be actuated alternately or simultaneously during the two actuation phases.

The actuating force generated in the case of simultaneous actuation may be generated in approximately equal parts by the electromechanical brake actuator and by the hydraulic pressure source. But it is also conceivable that in the case of simultaneous actuation the contributions of the hydraulic pressure source and the electromechanical brake actuator to the actuating force are different. For example, the component generated by the hydraulic pressure source or by the electromechanical brake actuator may be predominant.

If during the first actuation phase the actuating force applied to the vehicle brake is generated by sole actuation of the electromechanical brake actuator, then, for example, an actuating force is generated that corresponds to between 60% and 100% of the actuating force that is capable of being provided maximally by the electromechanical brake actuator.

The second actuating-force component can additionally (and independently of the determined second parameter) be determined from a current consumption, detected during the actuation of the hydraulic pressure source, of an electric motor assigned to the hydraulic pressure source. In this way, the second actuating-force component may be determined in two independent ways. The second actuating-force component determined via the current consumption of the hydraulic pressure source may be drawn upon for the purpose of checking the plausibility of the second actuating-force component which is capable of being determined via the second parameter.

According to a further aspect, a computer-program product with program code for implementing the method described herein when the computer-program product is executed on a computer device is made available. Such a computer device may include an electronic control unit (ECU) in the motor vehicle.

The computer-program product may be stored on a computer-readable data carrier. For example, the computer-program product may be stored on a removable data carrier such as, for example, a diskette, a hard disc, a CD-ROM or a DVD, or on a fixed data carrier such as a semiconductor memory, for example.

According to a further aspect, an apparatus is provided for determining an actuating force applied to a vehicle brake, wherein the vehicle brake is equipped with an electromechanical brake actuator, and wherein a first component of the actuating force is generated mechanically by actuation of the electromechanical brake actuator, and a second component of the actuating force is generated hydraulically by actuation of a hydraulic pressure source, the apparatus including the following components: a device for detecting a first parameter related to the electromechanical brake actuator and indicating the first actuating-force component, a device for determining a second parameter indicating the second actuating-force component from a progression of the registered first parameter, and a device for determining the actuating force applied to the vehicle brake from the first and second parameters.

The apparatus may further include a comparator which is provided to compare the second actuating-force component which is capable of being determined from the second parameter with a second actuating-force component determined from a current consumption of the hydraulic pressure source.

Furthermore, a motor-vehicle braking system is provided that includes an electromechanical brake actuator, a hydraulic circuit with hydraulic pressure source, a wheel brake coupled with the electromechanical brake actuator and with the hydraulic pressure source, and also the apparatus described herein.

Other advantages of this invention will become apparent to those skilled in the art from the following detailed description of the preferred embodiments, when read in light of the accompanying drawings.

BRIEF DESCRIPTION OF THE DRAWINGS

FIG. 4 is a diagram that shows the temporal progression of the generated actuating force as a function of the actuation of an electromechanical brake actuator and of a hydraulic pressure source of the vehicle braking system.

DETAILED DESCRIPTION OF THE INVENTION

Figure 1:
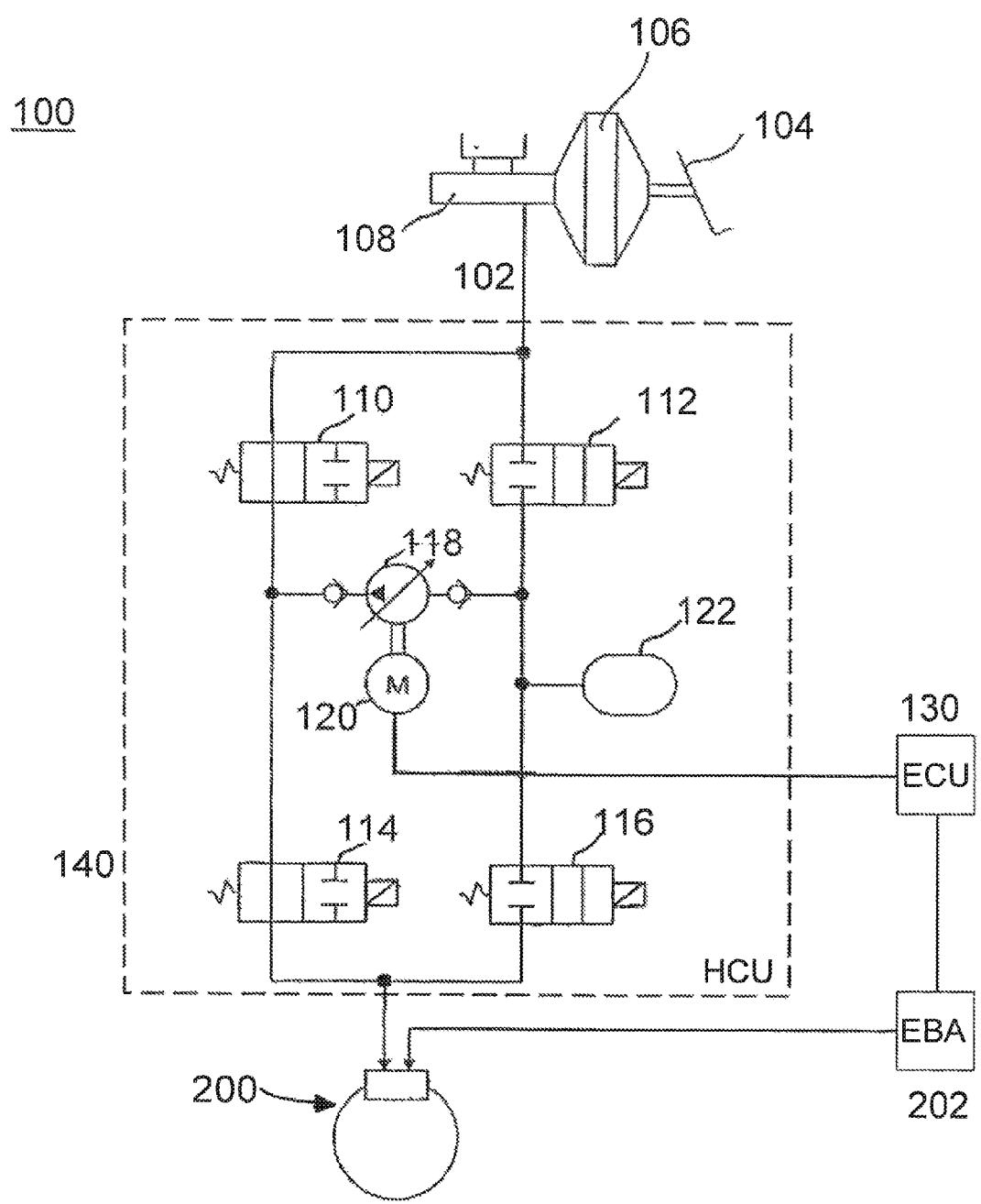
FIG. 1 is a vehicle braking system according to one embodiment.

On the basis of FIGS. 1 and 2 the components and the mode of operation of an embodiment of a hydraulic vehicle braking system 100 equipped with an electric parking brake (EPB) will be described in more detail. FIG. 1 shows a block diagram of the vehicle braking system 100. The representation of the vehicle braking system 100 is limited, for reasons of symmetry, to a single wheel brake 200 and to a brake circuit 102 assigned to the wheel brake 200.

The vehicle braking system 100 includes a brake pedal 104, a brake booster 106 and a master cylinder 108 connected downstream of the brake booster 106, which has been coupled on the output side with the brake circuit 102. The brake circuit 102 includes, in known manner, a hydraulic control unit 140 (HCU) with two check valves 110, 112, with ABS inlet and outlet valves 114, 116 assigned to the wheel brake 200, with a fluid reservoir 122, with a hydraulic pressure source 118 in the form of a hydraulic pump, and with an electric motor 120 assigned to the hydraulic pump 118.

The vehicle braking system 100 further includes an electromechanical brake actuator (EBA) 202 mechanically coupled with the wheel brake 200, and also an electronic control unit (ECU) 130. The electronic control unit 130 comprises all the electronic components and software for driving the hydraulic control unit 140 and the electromechanical brake actuator 202. The present arrangement corresponds to an integrated electric parking brake (EPBi) in which all the electronic components and software for driving the electromechanical brake actuator 202 have been integrated within the electronic control unit 130.

Within the scope of a service braking, a driver-controlled hydraulic pressure p is built on the wheel brake 200 via the master cylinder 108. In this connection the hydraulic control unit 140 switches check valve 110 and the ABS inlet valve 114 to a transmission position, and switches check valve 112 and the ABS outlet valve 116 to a blocking position (as shown in FIG. 1).

A hydraulic pressure p may furthermore also be generated independently of the driver. In this case, check valve 110 is switched to a blocking position, and check valve 112 and the ABS inlet valve 114 are switched to a transmission position, and subsequently the hydraulic pump 118 is actuated. The hydraulic pump 118 then aspirates hydraulic fluid on the input side, and on the output side pumps the aspirated hydraulic fluid to the wheel brake 200. In other words, the hydraulic pump 118 acts as a hydraulic actuator which actuates the wheel brake 200 hydraulically. In the course of the build-up of hydraulic pressure described herein, the ABS outlet valve 116 remains closed.

As an alternative to the hydraulic actuation described herein, the wheel brake 200 can also be actuated mechanically by means of the electromechanical brake actuator 202, by the electromechanical brake actuator 202 transmitting an actuating force F to the wheel brake 200. Furthermore, it is possible to generate the actuating force F to be generated on the wheel brake 200 by joint actuating of the electromechanical brake actuator 202 and the hydraulic pressure source 118.

On the basis of FIG. 2 the components and also the hydraulic and mechanical actuation of the wheel brake 200 of FIG. 1 will now be described more precisely.

Figure 2:
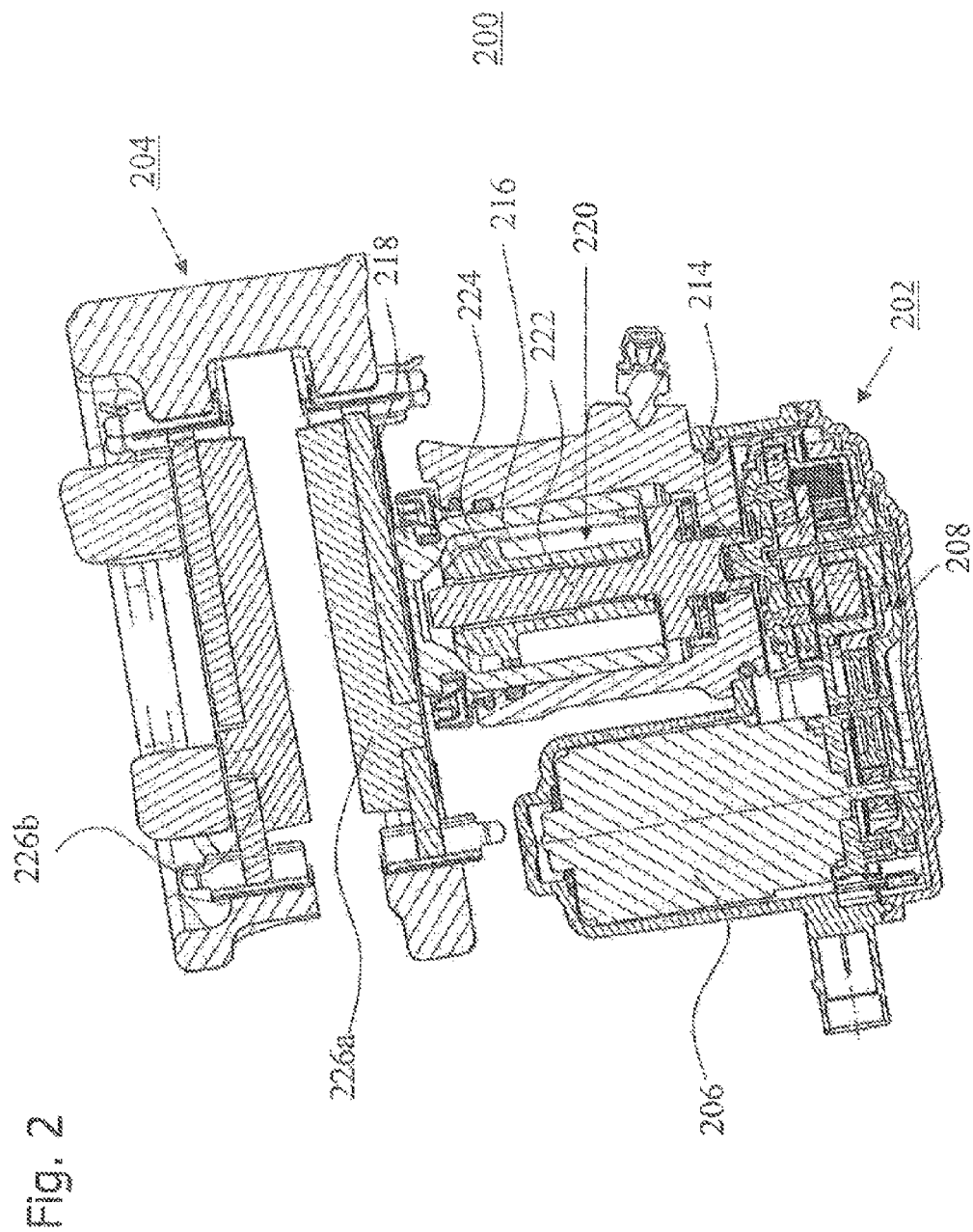
FIG. 2 is a wheel brake of the vehicle braking system according to FIG. 1.

FIG. 2 shows a cross section of the wheel brake 200 which includes a brake disc (not represented in FIG. 2), a U-shaped brake calliper 204 encompassing the brake disc, a hydraulic piston 218 received in a hydraulic chamber 216 of the wheel brake 200, and the electromechanical brake actuator 202 mechanically coupled with the hydraulic piston 218.

Upon hydraulic actuation of the wheel brake 200, hydraulic fluid flows into the hydraulic chamber 216. By virtue of the hydraulic fluid flowing in, a hydraulic pressure p is built up on the hydraulic piston 218, as a result of which the hydraulic piston 218 is translatorily displaced. The translational motion of the hydraulic piston 218 is transmitted to the brake pads 226a, 226b arranged on the inside of the brake calliper 204. Said pads are pressed against the brake disc, as a result of which an actuating force (clamping force) on the brake disc is generated which is proportional to the hydraulic pressure p applied to the hydraulic piston 218.

The hydraulic piston 218 is of hollow design for receiving an actuating member 220 of the electromechanical brake actuator 202. In the present embodiment the actuating member 220 is configured as a nut/spindle arrangement 222, 224 and connected in torsion-resistant manner to an output pin 214 of a gear unit 208 of the electromechanical brake actuator 202. The gear unit 208 is coupled a rotatably fixed manner on the input side with an electric motor 206 and is provided for the purpose of reducing the rotary motion generated at the electric motor 206 and transmitting it to the output pin 214. The rotary motion that is output at the output pin 214 is converted by the nut/spindle arrangement 222, 224 into a translational motion of the nut 224 which is proportional to the rotary motion. The nut 224 transmits the translational motion to the hydraulic piston 218. Depending on the direction of rotation of the spindle 222, the nut 224 moves in the direction of the hydraulic piston 218 or in the opposite direction, and consequently brings about a preloading or releasing of the wheel brake.

Figure 3:
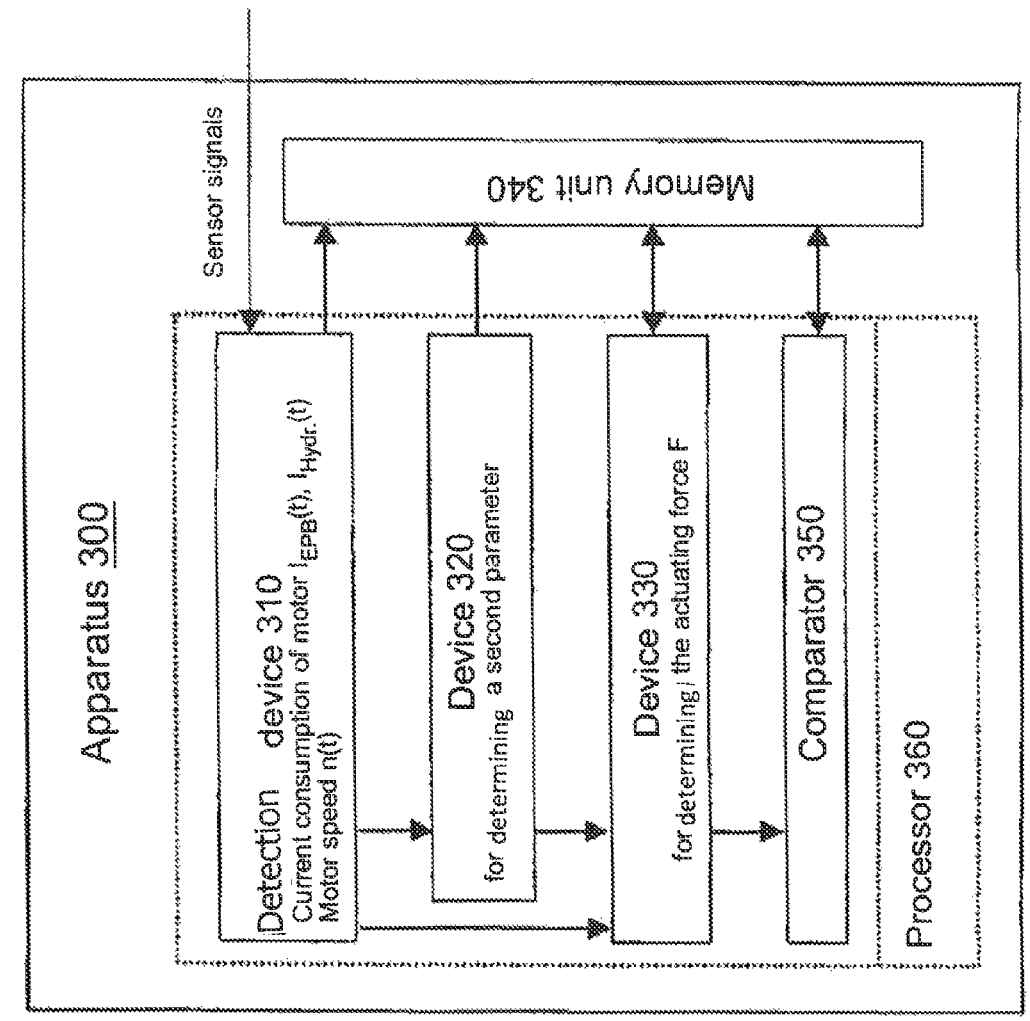
FIG. 3 is a schematic representation of an apparatus for determining an actuating force applied to the wheel brake according to an embodiment of the present invention.

With reference to FIGS. 3 and 4, an apparatus 300 and a method for determining an actuating force F generated by actuation of the electromechanical brake actuator 202 and of the hydraulic pump 118 within the scope of a parking-brake procedure will now be elucidated in more detail. It will be understood that the method described herein is not limited to a parking-brake procedure. Rather, said method is applicable to any braking function in which an actuating force F is generated jointly (but, where appropriate, in temporally separate manner) by the electromechanical brake actuator 202 and the hydraulic pump 118.

The apparatus 300 includes a device 310 for detecting a first parameter in connection with the electromechanical brake actuator 202, a device 320 for determining a second parameter on the basis of the first parameter, a device 330 for determining the actuating force F, a memory unit 340 and a processor 360. The apparatus 300 further includes a comparator 350. The processor 360 coordinates and controls the sequences between the interconnected individual devices. The apparatus 300 may take the form of a stand-alone unit or of an integrated constituent part of the electronic control unit 130.

The detection device 310 has been designed to detect the current consumption $I_{EPB}$ of the electric motor 206 during the actuation of the electromechanical brake actuator 202 as a function of the actuation time t. For this purpose, device 310 is connected to a motor-current sensor for measuring the motor current. As an alternative to this, also the control current, provided by the electronic control unit 130, for the electric motor 206 may be signalled to the detection device 310. The detection device 310 detects the current-consumption values $I_{EPB}$ continuously or at predetermined time intervals. The detection device 310 further detects the speed n(t) of the electric motor 206 as a function of the actuation time t (e.g. on the basis of current ripples). In addition, the detection device 310 is designed to detect a current consumption $I_{Hydr}$ of the electric motor 120 of the hydraulic pump 118, and/or the pump speed and pump strokes of the hydraulic pump 118. Device 310 is in communication with the memory unit 340 and with devices 320, 330. Said device passes the detected measured values to the memory unit 340 and/or directly to devices 320, 330 for further processing.

The device 320 for determining the second parameter is designed to analyze the progression of the detected current-consumption values $I_{EPB}$ as a function of the actuation time t. Said device is further designed to determine an idling time T of the motor from the temporal progression of the current consumption $I_{EPB}$ of the brake actuator 202. If device 320 is supplied with detected values of motor speed n(t) or with a previously stored idling speed of the motor, device 320 additionally determines an integrated motor speed N corresponding to the idling time T of the motor. Device 320 can further determine from the detected values of motor speed n(t) an integrated overall motor speed $N_{over}$, corresponding to the complete actuation. Device 320 passes the determined values to the memory unit 340 and/or to device 330.

The device 330 for determining the actuating force F is designed to determine, on the basis of the detected current consumption of the motor $I_{EPB}$ and the determined idling time T of the motor and/or the integrated motor speed N, a (resultant) actuating force F generated on the wheel brake 200. Device 330 in this case determines the actuating-force component $F_{EPB}$ of the electromechanical brake actuator 202 from a current difference $\Delta I_{EPB}$ between a minimal and a maximal current-consumption value.

Device 330 further determines, from the idling time T of the motor determined in device 320, from the integrated motor speed N or from the integrated overall motor speed $N_{over}$, the corresponding actuation path-length of the nut 224 and/or the hydraulic actuating-force component $F_{Hydr}$ by means of a previously stored assignment table. The assignment table in this case establishes an unambiguous relationship between the idling time T of the motor and/or the motor speed N as well as the actuation path-length of the nut 224, and the actuating force F. As an alternative to this, device 330 may calculate, by means of a model and previously stored values for gear reduction, the actuation path-length of the nut 224 during the idling time T of the motor. From this, the hydraulic actuating-force component $F_{Hydr}$ is then determined with the aid of previously stored brake-stiffness values. The actuating force F is then determined from the superposition (addition) of both force components $F_{EPB}$, $F_{Hydr}$.

Device 330 is also provided for determining the hydraulically generated actuating-force component $F_{Hydr}$ from the detected motor-current values $I_{Hydr}$ of the hydraulic pump 118 or via model computation from the detected pump speed and pump strokes (irrespective of the motor-current consumption of the brake actuator 202).

The memory unit 340 is designed to store the detected measured values temporarily and to make them available to devices 330, 350 as required. Furthermore, the memory unit 340 is provided to store determined actuating forces F and actuating-force components $F_{EPB}$, $F_{Hydr}$ as well as brake-specific parameters relevant for the determination of the actuating force F, such as, for example, the reduction ratio of the gearing 208 or the brake stiffness, and to make them available as required to devices 330, 350.

The comparator 350 is designed to compare the hydraulic actuating-force component $F_{Hydr}$ determined by device 330 on the basis of the idling time T of the motor and/or on the basis of the integrated motor speed N with the hydraulic actuating-force component $F_{Hydr}$ determined via the current consumption $I_{Hydr}$ of the hydraulic pump 118, and to detect deviations between the two determined values. If the deviations exceed a predetermined tolerance value, an error signal which indicates an erroneous determination of the actuating force F is output to the driver.

On the basis of FIGS. 4a and 4b the temporal actuation of the hydraulic pump 118 and of the electromechanical brake actuator 202 for joint generation of a parking-brake force, and also the determination of the same, will now be described in more detail using the example of a parking-brake procedure.

FIG. 4a shows a pressure/actuating-force time diagram in which the hydraulic pressure (dashed line) generated by the hydraulic pump 118 and also the actuating force F (solid line) generated by joint actuation of the hydraulic pump 118 and the electromechanical brake actuator are plotted as a function of the actuation time t. FIG. 4b shows, in a current/time diagram, the current consumption $I_{EPB}$, $I_{Hydr}$ of the electric motors 118, 206 as a function of the actuation time t.

The build-up of the actuating force occurs in three actuation phases. During a first actuation phase, firstly by actuation of the electromechanical brake actuator 202 (cf. first EPB actuation in FIG. 4b) an actuating force ($F=F_{EPB}$) is generated mechanically on the wheel brake 200. The actuating force F in this case amounts typically to more than 70% of the actuating force that is capable of being provided maximally by the electromechanical brake actuator 202. Thereupon the electromechanical brake actuator 202 is switched off (in the present example, after about 0.4 sec), the generated actuating force being maintained by the self-locking action of the spindle/nut arrangement 222, 224 (cf. region in FIG. 4a in which the actuating-force/time curve is horizontal).

The determination of the actuating force (F) generated during the first actuation phase is effected with the aid of the detected current consumption $I_{EPB}$ of the brake actuator 202. As clarified in FIG. 4b, the current-consumption characteristic has an initially strongly downward slope, followed by a turning-point and a region in which the current rises again monotonically with increasing actuation time t until the brake actuator 202 is switched off. This region of increasing current consumption correlates with the actuating force generated on the wheel brake 200 (cf. diagrams of FIGS. 4a and 4b for the first actuation phase). The level of the current consumption reflects the magnitude of the generated actuating force F.

From the current difference $\Delta I_{EPB}$ between the detected maximal current consumption at the end of the actuation and a minimal current consumption (the no-load current consumption may correspond to this) the determination unit 330 determines the effective actuating force generated by the brake actuator 202 (magnitude "a" in FIG. 4b). By subtraction, a measurement error (magnitude "b" in FIG. 4b) due to the no-load current of the electromechanical brake actuator is eliminated. The initial high current consumption is connected with the starting of the electric motor and is not relevant for the determination of the actuating force.

In a following second actuation phase the hydraulic pump 118 is actuated while the electromechanical brake actuator 202 remains switched off. The hydraulic pump 118 pumps hydraulic fluid into the hydraulic chamber 216. In the process, the hydraulic pressure in the hydraulic chamber 216 rises continuously until the hydraulic pressure p reaches the piston pressure already set (the piston pressure corresponds to the force exerted by the actuating member 220, normalized to the piston area). Finally, the generated hydraulic pressure p exceeds the mechanically generated piston pressure, so that the hydraulic piston 218 is moved further in the direction of the brake calliper 204. The actuating force generated in the first actuation phase is consequently further increased hydraulically. The rise in actuating force in this case is directly proportional to the generated hydraulic pressure p, as is clarified in FIG. 4a by the superimposition of the two curves.

The hydraulic displacement of the hydraulic piston 218 additionally brings about a spatial separation between the hydraulic piston 218, on the one hand, and the nut 224, on the other hand. This means that at the end of the second actuation phase the nut/spindle arrangement 222, 224 is load-free and the actuating force F applied overall results from the hydraulic pressure p applied to the hydraulic piston 218.

During the actuation of the hydraulic pump 118 the detection device 310 detects the current consumption $I_{Hydr}$ of the hydraulic pump 118. The correspondingly detected current curve is represented schematically in FIG. 4b (central diagram). The current characteristic in this case corresponds substantially to the current characteristic described above for the electromechanical brake actuator 202. In particular, device 330 determines from the current difference $\Delta I_{Hydr}$ between a maximal and a minimal current consumption the actuating-force component built up by the hydraulic pump 118 (cf. FIG. 4b). In the embodiment described here, it is to be noted that the hydraulic pump 118 is activated during the second, and initially during a subsequent third, actuation phase, and that the registered current difference $\Delta I_{Hydr}$ corresponds to the hydraulic actuating-force component that has been built up during the second and third actuation phases.

In the following third actuation phase the electromechanical brake actuator 202 together with the hydraulic pump 118 is actuated a second time (cf. second EPB actuation in FIG. 4b). In this way, the actuating force F generated during the first two phases is increased still further by simultaneous actuating of both actuators 118, 202. Once a certain actuating force (predetermined desired value of actuating force) has been attained, the two actuators 118, 202 are switched off. In the process, the hydraulic pressure p in the hydraulic chamber 216 is continuously reduced (cf. downward slope in FIG. 4a). The generated actuating force F, however, is substantially preserved by reason of the advanced position of the nut 222. Slight losses of actuating force (cf. magnitude "g" in FIG. 4a) may occur, however, when the hydraulic piston 218 is locked in place by the nut/spindle arrangement 222, 224 (e.g. by virtue of settling effects).

The increase in actuating force in the third actuation phase is the result of a superimposition of mechanically and hydraulically generated actuating forces. As is evident from FIG. 4a, during the third phase the resulting actuating force F increases disproportionately with the increase in hydraulic pressure, this being due to the additionally generated mechanical component of the actuating force F. In this connection it is to be noted that, by virtue of the liberation of the hydraulic piston from the nut/spindle arrangement during the second actuation phase, the brake actuator 202 can again provide the full actuating force $F_{EPB}$.

In order to realize an increase in actuating force on the basis of the simultaneous actuation of the hydraulic pump 118 and the brake actuator 202, the two actuators 118, 202 can be driven in such a manner that both actuators display roughly the same rate of increase of actuating force. This requires an increased conveying capacity of the hydraulic pump 118 in order to replenish the volume of the hydraulic-pressure chamber 216, which has been additionally enlarged by the actuating member 220, with hydraulic fluid. Only in this way can a sudden lowering or stagnation of the hydraulic pressure in the hydraulic chamber 216 be prevented.

During the third actuation phase the detection device 310 again detects (in parallel with the current consumption $I_{Hydr}$ of the hydraulic pump 118) the current consumption $I_{EPB}$ of the brake actuator 202. From the current difference $\Delta I_{EPB}$ of the electromechanical brake actuator 202, device 330 determines the effective actuating force generated by the brake actuator 202 (magnitude "e" in FIG. 4b) during the third actuation phase. The sum of magnitudes "a" and "e" then yields the actuating-force component $F_{EPB}$ generated mechanically by the brake actuator 202 during the first and third actuation phases.

The actuating-force component $F_{Hydr}$, effectively generated during the third actuation phase by the hydraulic pump 118 is determined by device 330 with the aid of the integrated overall motor speed $N_{over}$ and the aforementioned previously stored assignment table for determining the actuation path-length of the nut 224 and the actuating-force component corresponding thereto. It should be pointed out that in the present example the actuating-force component corresponding to the actuation path-length of the nut 224 (cf. magnitude "d", which in FIG. 4b symbolizes the actuating-force component and not the actuation path-length of the nut 224) corresponds to the hydraulic actuating-force component $F_{Hydr}$, effectively generated during the second and third actuation phases, and to the mechanical actuating-force component "e" additionally generated in the third actuation phase. The effective hydraulic actuating-force component $F_{Hydr}$ then results from the difference of the magnitudes "d" and "e". The resulting actuating force F is yielded, with additional consideration of losses of actuating force arising by virtue of settling effects, from the superimposition of the two force components in accordance with the following relationship:

$$F = F_{EPB} + F_{Hydr} - F_{sett} = (a+e) + (d-e) - g = a+d-g.$$

The method described herein consequently enables the determination of the resulting actuating force F and of the actuating-force components $F_{EPB}$, $F_{Hydr}$ generated by the electromechanical brake actuator 202 and by the hydraulic pressure source 118 solely on the basis of measured variables relating to the electromechanical brake actuator 202 (measured variables that relate to the hydraulic pressure source are not needed for the determination).

As already stated above, device 330 can determine the hydraulic actuating force additionally from the current consumption of the hydraulic pump 118. For the embodiment shown in FIGS. 4a and 4b, the actuating-force component determined from the current consumption of the hydraulic pump 118 (cf. magnitude "c" in FIG. 4b) corresponds to the effective hydraulic actuating force $F_{Hydr}$ generated by the hydraulic pump 118 and to the component "a" generated mechanically during the first actuation phase.

Device 330 can consequently determine the hydraulic actuating-force component $F_{Hydr}$ in two different ways. The differently determined values for the hydraulic actuating-force component $F_{Hydr}$ can be compared with one another by the comparator 350 and checked for their plausibility. In this way, errors when determining the actuating force built up by the hydraulic pump and by the electromechanical brake actuator can be detected and avoided.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A method for determining an actuating force applied to a vehicle brake, wherein the vehicle brake is equipped with an electromechanical brake actuator, comprising the following steps:

mechanically generating a of actuating-force component by actuation of the electromechanical brake actuator;

hydraulically generating a second actuating-force component by actuation of a hydraulic pressure source;

detecting a first parameter related to the electromechanical brake actuator and indicating the first actuating force component;

determining a second parameter indicating the second actuating force component from a progression of the detected first parameter, wherein the second parameter is determined from a temporal progression of electrical current consumption; and determining the actuating force applied to the vehicle brake from the first and the second parameters.

2. The method according to claim 1, wherein the first parameter is detected during the actuation of the electromechanical brake actuator and corresponds to the electrical current consumption of an electric motor assigned to the electromechanical brake actuator.

3. The method according to claim 2, wherein the second parameter indicates an idling phase of the electric motor.

4. The method according to claim 3, wherein the second parameter corresponds to a duration of the idling phase of the motor.

5. The method according to claim 3, wherein the second parameter corresponds to an integrated motor speed during the idling phase of the motor.

6. The method according to claim 1, wherein the second actuating-force component is determined from the second parameter and from a brake stiffness.

7. The method according to claim 1, wherein the first actuating-force component and the second actuating-force component are generated during one or more actuation phases.

8. The method according to claim 7, wherein during at least one actuation phase the electromechanical brake actuator and the hydraulic pressure source are actuated simultaneously.

9. The method according to claim 8, wherein the force component generated in the case of simultaneous actuation is generated in approximately equal parts by the electromechanical brake actuator and the hydraulic pressure source.

10. The method according to claim 1, wherein the first actuating-force component and the second actuating-force component are generated in three actuation phases, wherein during the first actuation phase the electromechanical brake actuator is actuated, during the second actuation phase the hydraulic pressure source is actuated, and during the third actuation phase the electromechanical brake actuator and the hydraulic pressure source are actuated simultaneously.

11. The method according to claim 10, wherein the actuating force applied during the first actuating procedure amounts to more than 60% of the actuating force that is capable of being provided maximally by the electromechanical brake actuator.

12. The method according to claim 1, wherein the second actuating force component is additionally determined from a current consumption, detected during the actuation of the hydraulic pressure source, of an electric motor assigned to the hydraulic pressure source.

13. The method according to claim 12, wherein for the purpose of checking plausibility, the second actuating-force component determined from the current consumption of the electric motor assigned to the hydraulic pressure source is compared with the second actuating-force component determined from the second parameter.

14. The method according to claim 1, wherein the method for determining the actuating force is carried out within the scope of a parking-brake procedure.

15. The method according to claim 1, wherein the method is implemented by a computer-program product with program code when the computer-program product is executed on a computer device.

16. The method according to claim 15, wherein the computer program product has been stored on a computer-readable recording medium.

17. The method according to claim 1, wherein the first parameter is detected at the vehicle brake.

18. An apparatus for determining an actuating force applied to a vehicle brake, wherein the vehicle brake is equipped with an electromechanical brake actuator, the apparatus including the following components;

a first actuating-force component mechanically generated by actuation of the electromechanical brake actuator;

a second actuating-force component hydraulically generated by actuation of a hydraulic pressure source;

a device for detecting a first parameter related to the electromechanical brake actuator and indicating the first actuating-force component;

a device for determining a second parameter indicating the second actuating-force component from the progression of the detected first parameter, wherein the second parameter is determined from a temporal progression of electrical current consumption; and a device for determining the actuating force applied to the vehicle brake from the first and second parameters.

19. The apparatus according to claim 18, further including a comparator for comparing the actuating-force component that is capable of being determined from the second parameter with the second actuating-force component determined from a current consumption of the hydraulic pressure source.

20. The apparatus according to claim 18, wherein the first parameter is detected at the vehicle brake.

21. A motor-vehicle braking system including an electromechanical brake actuator, a hydraulic circuit with hydraulic pressure source, a wheel brake coupled with the electromechanical brake actuator and with the hydraulic pressure source, and an apparatus for determining an actuating force applied to a vehicle brake, wherein the vehicle brake is equipped with an electromechanical brake actuator, the apparatus including the following components:

a first actuating-force component mechanically generated by actuation of the electromechanical brake actuator;

a second actuating-force component hydraulically generated by actuation of hydraulic pressure source;

a device for detecting a first parameter related to the electromechanical brake actuator and indicating the first actuating-force component;

a device for determining a second parameter indicating the second actuating-force component from the progression of the detected first parameter, wherein the second parameter is determined from a temporal progression of electrical current consumption; and a device for determining the actuating force applied to the vehicle brake from the first and second parameters.

22. The apparatus according to claim 21, wherein the first parameter is detected at the vehicle brake.

* * * * *